US010228165B2

(12) United States Patent
Makansi et al.

(10) Patent No.: US 10,228,165 B2
(45) Date of Patent: Mar. 12, 2019

(54) THERMOELECTRIC STRING, PANEL, AND COVERS FOR FUNCTION AND DURABILITY

(71) Applicant: TEMPRONICS, INC., Tucson, AZ (US)

(72) Inventors: Tarek Makansi, Tucson, AZ (US); John L. Franklin, Tucson, AZ (US); Mark N. Evers, Tucson, AZ (US); Kevin C. Forbes, Tucson, AZ (US); Jose Santos Dominguez, Bisbee, AZ (US); Michael T. Sato, Tucson, AZ (US)

(73) Assignee: TEMPRONICS, INC., Tucson, AZ (US)

( * ) Notice: Subject to any disclaimer, the term of this patent is extended or adjusted under 35 U.S.C. 154(b) by 218 days.

(21) Appl. No.: 14/530,360

(22) Filed: Oct. 31, 2014

(65) Prior Publication Data

US 2015/0121901 A1    May 7, 2015

Related U.S. Application Data

(60) Provisional application No. 61/899,665, filed on Nov. 4, 2013, provisional application No. 61/939,619, filed (Continued)

(51) Int. Cl.
*F25B 21/02*   (2006.01)
*B60N 2/56*    (2006.01)
(Continued)

(52) U.S. Cl.
CPC ........... *F25B 21/02* (2013.01); *A47C 7/742* (2013.01); *A47C 21/044* (2013.01);
(Continued)

(58) Field of Classification Search
CPC .............. B60N 2/5692; H01L 35/32; F25B 2321/0251; F25B 2321/023; F25B 21/02;
(Continued)

(56) References Cited

U.S. PATENT DOCUMENTS 2,376,902 A    5/1945  Clark
RE22,763 E     6/1946  Clark
(Continued)

FOREIGN PATENT DOCUMENTS

CN    201636597        11/2010    ............... F21S 2/00
CN    103098249 A      5/2013
(Continued)

OTHER PUBLICATIONS

Office action dated Aug. 10, 2016 for U.S. Appl. No. 14/430,596.
(Continued)

*Primary Examiner* — Filip Zec
(74) *Attorney, Agent, or Firm* — Wilson Sonsini Goodrich & Rosati

(57) ABSTRACT

A thermoelectric device comprising an elongated panel of two foam layers, and having an inserted thermoelectric string is incorporated into a seat cushion, planting pot, and battery thermal manager. Several enhancements to the string and the panel improve its durability, visual appeal, and tactile appeal over the prior art.

18 Claims, 13 Drawing Sheets

Diagram of thermoelectric panel for heating and cooling a battery

Related U.S. Application Data on Feb. 13, 2014, provisional application No. 62/019,849, filed on Jul. 1, 2014.

(51) Int. Cl.

| A47C 7/74 | (2006.01) |
|---|---|
| A47C 21/04 | (2006.01) |
| A61G 5/10 | (2006.01) |
| F25B 21/04 | (2006.01) |
| A61G 7/057 | (2006.01) |

(52) U.S. Cl.
CPC ......... *A61G 5/1043* (2013.01); *B60N 2/5692* (2013.01); *A61G 7/05707* (2013.01); *F25B 21/04* (2013.01); *F25B 2321/02* (2013.01); *F25B 2321/0251* (2013.01)

(58) Field of Classification Search
CPC .... F25B 21/04; F25B 2321/02; A47C 21/044; A61G 7/05707
See application file for complete search history.

(56) References Cited

U.S. PATENT DOCUMENTS

| | | |
|---|---|---|
| 2,606,996 A | 8/1952 | Westerberg et al. |
| 2,796,532 A | 6/1957 | Teague et al. ................ 250/213 |
| 2,858,350 A | 10/1958 | Fritts et al. ........................ 136/4 |
| 3,083,381 A | 4/1963 | Bailey |
| 3,129,345 A | 4/1964 | Hatsopoulos et al. ........ 310/306 |
| 3,136,577 A | 6/1964 | Richard |
| 3,173,032 A | 3/1965 | Maynard ..................... 310/306 |
| 3,196,524 A | 7/1965 | Jamison ...................... 29/155.5 |
| 3,217,189 A | 11/1965 | Bloss ............................. 310/306 |
| 3,225,549 A | 12/1965 | Elfving ............................... 62/3 |
| 3,406,753 A | 10/1968 | Habdas ......................... 165/185 |
| 3,549,201 A | 12/1970 | Wolfe ............................ 297/284 |
| 3,627,988 A | 12/1971 | Romaniec .................... 219/529 |
| 3,754,703 A | 8/1973 | Saponara ................... 236/15 A |
| 4,343,993 A | 8/1982 | Binnig et al. ................. 250/306 |
| 4,423,308 A | 12/1983 | Callaway et al. |
| 4,523,594 A | 6/1985 | Kuznetz |
| 4,625,394 A | 12/1986 | Kemnitz et al. ................ 29/611 |
| 4,820,903 A | 4/1989 | Ishida ........................... 219/213 |
| 4,825,488 A | 5/1989 | Bedford ............................ 5/469 |
| 4,825,868 A | 5/1989 | Susa et al. .................... 128/376 |
| 4,930,317 A | 6/1990 | Klein ............................. 62/3.3 |
| 4,937,435 A | 6/1990 | Goss et al. |
| 4,969,684 A | 11/1990 | Zarotti |
| 5,028,835 A | 7/1991 | Fitzpatrick ..................... 313/14 |
| 5,138,851 A | 8/1992 | Mardikian |
| 5,541,464 A | 7/1996 | Johnson et al. ............. 310/306 |
| 5,594,534 A | 1/1997 | Genovese .................... 399/285 |
| 5,653,741 A | 8/1997 | Grant |
| 5,712,448 A | 1/1998 | Vandersande et al. |
| 5,837,002 A | 11/1998 | Augustine et al. |
| 5,851,338 A | 12/1998 | Pushaw |
| 5,892,656 A | 4/1999 | Bass ............................. 361/699 |
| 5,917,229 A | 6/1999 | Nathan et al. |
| 6,064,137 A | 5/2000 | Cox ............................... 310/306 |
| 6,129,990 A | 10/2000 | Frater ........................... 428/607 |
| 6,220,659 B1 | 4/2001 | McDowell et al. ..... 297/180.12 |
| 6,223,539 B1 * | 5/2001 | Bell ................... B60H 1/00471 62/3.3 |
| 6,230,501 B1 | 5/2001 | Bailey, Sr. et al. |
| 6,323,413 B1 | 11/2001 | Roth et al. .................... 136/201 |
| 6,323,777 B1 | 11/2001 | Durston et al. .............. 340/679 |
| 6,328,594 B1 | 12/2001 | Mullen, Jr. |
| 6,385,976 B1 | 5/2002 | Yamamura et al. ............ 62/3.7 |
| 6,410,971 B1 | 6/2002 | Otey .............................. 257/467 |
| 6,494,048 B1 | 12/2002 | Ghoshal et al. ................ 62/3.7 |
| 6,501,055 B2 | 12/2002 | Rock et al. ................... 219/545 |
| 6,523,354 B1 | 2/2003 | Tolbert |
| 6,582,456 B1 | 6/2003 | Hand et al. ................... 607/108 |
| 6,639,242 B1 | 10/2003 | Chen et al. ..................... 257/19 |
| 6,651,760 B2 | 11/2003 | Cox et al. ..................... 180/65.3 |
| 6,653,607 B2 | 11/2003 | Ellis et al. .................... 219/528 |
| 6,720,704 B1 | 4/2004 | Tavkhelidze et al. ........ 310/306 |
| 6,774,003 B2 | 8/2004 | Tavkhelidze et al. ........ 310/306 |
| 6,823,678 B1 | 11/2004 | Li |
| 6,863,981 B2 | 3/2005 | McBain ........................ 428/412 |
| 6,876,123 B2 | 4/2005 | Martinovsky et al. ........ 310/306 |
| 6,884,732 B2 | 4/2005 | Najafi et al. .................. 438/713 |
| 6,946,596 B2 | 9/2005 | Kucherov et al. ............ 136/205 |
| 7,005,381 B1 | 2/2006 | Cox ............................... 438/689 |
| 7,117,687 B2 | 10/2006 | Naaman |
| 7,140,102 B2 | 11/2006 | Taliashvili et al. ............. 29/842 |
| 7,152,412 B2 * | 12/2006 | Harvie ............... A41D 13/0051 62/244 |
| 7,253,549 B2 | 8/2007 | Tavkhelidze et al. ........ 310/306 |
| 7,273,490 B2 * | 9/2007 | Lachenbruch ............ A61F 7/10 607/104 |
| 7,305,839 B2 | 12/2007 | Weaver, Jr. .................... 62/132 |
| 7,456,543 B2 | 11/2008 | Makansi ....................... 310/306 |
| 7,708,338 B2 | 5/2010 | Wolas |
| 7,996,936 B2 | 8/2011 | Marquette et al. ............... 5/423 |
| 8,018,117 B2 | 9/2011 | Makansi |
| 8,066,324 B2 | 11/2011 | Nathan et al. |
| 8,102,096 B2 | 1/2012 | Makansi |
| 8,101,847 B2 | 2/2012 | Okamura ...................... 136/200 |
| 8,327,477 B2 | 12/2012 | Lachenbruch et al. ........... 5/421 |
| 8,495,974 B2 | 7/2013 | Agosta |
| 8,969,703 B2 | 3/2015 | Makansi et al. |
| 9,066,601 B1 | 6/2015 | Aminy et al. |
| 9,272,647 B2 * | 3/2016 | Gawade ............... B60N 2/5678 |
| 9,408,475 B2 * | 8/2016 | Mikkelsen ........... A47G 9/1036 |
| 2001/0011601 A1 | 8/2001 | Renaud |
| 2001/0046749 A1 | 11/2001 | Tavkhelidze et al. ........ 438/380 |
| 2002/0046762 A1 | 4/2002 | Rossi ............................. 136/201 |
| 2002/0058975 A1 | 5/2002 | Bieberich |
| 2002/0170172 A1 | 11/2002 | Tavkhelidze et al. ........... 29/842 |
| 2003/0042819 A1 | 3/2003 | Martinovsky et al. ........ 310/306 |
| 2003/0084935 A1 | 5/2003 | Bell |
| 2003/0131419 A1 | 7/2003 | Vansteenburg |
| 2003/0141455 A1 | 7/2003 | Lambert et al. .............. 250/353 |
| 2003/0154725 A1 | 8/2003 | McGrew ......................... 62/3.7 |
| 2003/0184188 A1 | 10/2003 | Kucherov et al. ............ 310/306 |
| 2003/0230913 A1 | 12/2003 | Buss et al. |
| 2004/0009729 A1 | 1/2004 | Hill et al. |
| 2004/0050415 A1 | 3/2004 | Kucherov et al. ............ 136/252 |
| 2004/0100131 A1 | 5/2004 | Howick et al. |
| 2004/0160092 A1 | 8/2004 | Laib |
| 2004/0195934 A1 | 10/2004 | Tanielian ...................... 310/306 |
| 2005/0050415 A1 | 3/2005 | Anand et al. ................. 714/726 |
| 2005/0066505 A1 | 3/2005 | Iqbal et al. |
| 2005/0077618 A1 | 4/2005 | McCutcheon et al. |
| 2005/0140189 A1 | 6/2005 | Bajic et al. |
| 2005/0184565 A1 | 8/2005 | Weiss et al. |
| 2005/0184603 A1 | 8/2005 | Martsinovsky ................ 310/49 |
| 2005/0189871 A1 | 9/2005 | Tavkhelidze et al. ........ 313/498 |
| 2005/0253425 A1 | 11/2005 | Asada et al. |
| 2006/0000226 A1 | 1/2006 | Weaver, Jr. .................... 62/132 |
| 2006/0027552 A1 | 2/2006 | Krobok et al. |
| 2006/0038290 A1 | 2/2006 | Tavkhelidze et al. ........ 257/734 |
| 2006/0068176 A1 | 3/2006 | Zafiroglu et al. |
| 2006/0110657 A1 * | 5/2006 | Stanton ............... H01M 2/1072 429/120 |
| 2006/0138896 A1 | 6/2006 | Makansi ....................... 310/306 |
| 2006/0162761 A1 | 7/2006 | Tanielian ..................... 136/205 |
| 2006/0180829 A1 | 8/2006 | Martsinovsky ............... 257/104 |
| 2006/0191886 A1 | 8/2006 | Pak, II |
| 2006/0192196 A1 | 8/2006 | Tavkhelidze et al. .......... 257/30 |
| 2006/0207643 A1 | 9/2006 | Weaver, Jr. ................... 136/205 |
| 2007/0001507 A1 | 1/2007 | Brennan et al. |
| 2007/0023077 A1 | 2/2007 | Tanielian ..................... 136/201 |
| 2007/0033782 A1 | 2/2007 | Taliashvili et al. ........... 29/25.02 |
| 2007/0056623 A1 | 3/2007 | Tavkhelidze et al. ........ 136/205 |
| 2007/0069357 A1 | 3/2007 | Weaver et al. ............... 257/686 |
| 2007/0084220 A1 | 4/2007 | Asada et al. |
| 2007/0112390 A1 | 5/2007 | Lau et al. ....................... 607/37 |
| 2007/0137687 A1 | 6/2007 | Tanielian ..................... 136/205 |
| 2007/0181913 A1 | 8/2007 | Li ................................. 257/213 |
| 2007/0272673 A1 | 11/2007 | Keane |
| 2007/0277313 A1 | 12/2007 | Terech et al. |

(56) References Cited

U.S. PATENT DOCUMENTS

| | | | |
|---|---|---|---|
| 2007/0289620 A1 | 12/2007 | Stark | 136/205 |
| 2007/0295973 A1 | 12/2007 | Jinbo et al. | 257/88 |
| 2008/0015665 A1* | 1/2008 | Lachenbruch | A61F 7/10 607/104 |
| 2008/0017237 A1 | 1/2008 | Bray et al. | 136/224 |
| 2008/0029146 A1 | 2/2008 | Plissonnier et al. | 136/242 |
| 2008/0042163 A1 | 2/2008 | Weaver, Jr. | 257/108 |
| 2008/0054490 A1 | 3/2008 | McLellan et al. | |
| 2008/0155981 A1 | 7/2008 | Tanielian | 60/527 |
| 2008/0173022 A1 | 7/2008 | Petrovski | 62/3.2 |
| 2008/0237827 A1 | 10/2008 | Autry | 257/688 |
| 2009/0025774 A1 | 1/2009 | Plissonnier et al. | 136/224 |
| 2009/0038317 A1 | 2/2009 | Otey | |
| 2009/0078690 A1 | 3/2009 | Lee et al. | |
| 2009/0121524 A1 | 5/2009 | Abe et al. | |
| 2009/0199571 A1 | 8/2009 | Creech et al. | 62/3.2 |
| 2009/0200983 A1 | 8/2009 | Dyer et al. | 320/107 |
| 2009/0205695 A1 | 8/2009 | Makansi | 136/201 |
| 2009/0229648 A1 | 9/2009 | Makansi | 136/201 |
| 2009/0257774 A1 | 10/2009 | Rummler et al. | |
| 2009/0283124 A1 | 11/2009 | Seo | 136/201 |
| 2009/0322221 A1 | 12/2009 | Makansi | 313/523 |
| 2010/0031448 A1 | 2/2010 | Hijlkema | |
| 2010/0101620 A1 | 4/2010 | Tanaka | 136/205 |
| 2010/0107657 A1 | 5/2010 | Vistakula | 62/3.5 |
| 2010/0269517 A1 | 10/2010 | Ikeda et al. | 62/3.7 |
| 2010/0270996 A1 | 10/2010 | Ramadas et al. | 323/311 |
| 2010/0281884 A1* | 11/2010 | Rawski | F25B 21/04 62/3.6 |
| 2010/0288370 A1 | 11/2010 | Volden et al. | |
| 2010/0327636 A1 | 12/2010 | Stoll et al. | |
| 2011/0016886 A1 | 1/2011 | Ghoshal et al. | 62/3.2 |
| 2011/0109128 A1 | 5/2011 | Axakov et al. | |
| 2011/0139203 A1 | 6/2011 | Yap | 136/205 |
| 2011/0226299 A1 | 9/2011 | Makansi | |
| 2011/0240751 A1 | 10/2011 | Rauh et al. | |
| 2012/0019074 A1 | 1/2012 | Frolov et al. | 307/82 |
| 2012/0032478 A1 | 2/2012 | Friderich et al. | |
| 2012/0060882 A1 | 3/2012 | Makansi | |
| 2012/0060885 A1 | 3/2012 | Makansi et al. | 136/206 |
| 2012/0110734 A1 | 5/2012 | An | 5/423 |
| 2012/0113594 A1 | 5/2012 | Goettert et al. | 361/699 |
| 2012/0131748 A1 | 5/2012 | Brykalski et al. | |
| 2012/0146455 A1 | 6/2012 | Makansi | |
| 2012/0148328 A1 | 6/2012 | Jollet | 401/2 |
| 2012/0198616 A1 | 8/2012 | Makansi et al. | |
| 2013/0008181 A1 | 1/2013 | Makansi et al. | |
| 2013/0014796 A1 | 1/2013 | Tajima | 136/203 |
| 2013/0097777 A1 | 4/2013 | Marquette et al. | |
| 2013/0106147 A1 | 5/2013 | Lazanja et al. | |
| 2013/0180563 A1 | 7/2013 | Makansi | |
| 2014/0041396 A1 | 2/2014 | Makansi et al. | |
| 2014/0082846 A1 | 3/2014 | Blazar | |
| 2014/0208521 A1* | 7/2014 | Farnham | A47C 27/144 5/724 |
| 2014/0331688 A1 | 11/2014 | Kossakovski et al. | |
| 2015/0219368 A1 | 8/2015 | Makansi et al. | |
| 2015/0266405 A1 | 9/2015 | Fitzpatrick et al. | |
| 2016/0133817 A1 | 5/2016 | Makansi et al. | |
| 2017/0159980 A1 | 6/2017 | Makansi et al. | |
| 2017/0261241 A1 | 9/2017 | Makansi et al. | |
| 2017/0273830 A1 | 9/2017 | Hitschmann | |

FOREIGN PATENT DOCUMENTS

| | | | |
|---|---|---|---|
| DE | 4010909 | 10/1991 | H01J 21/04 |
| EP | 1612492 | 1/2006 | F25B 21/00 |
| GB | 2065465 | 7/1981 | A47C 31/00 |
| JP | S6147907 A | 3/1986 | |
| JP | H02116613 U | 9/1990 | |
| JP | H09197806 A | 7/1997 | |
| JP | 2002519100 A | 7/2002 | |
| JP | 2003042590 A | 2/2003 | |
| JP | 2003209297 | 7/2003 | H01L 35/32 |
| JP | 2003526484 A | 9/2003 | |
| JP | 2006081575 A | 3/2006 | |
| JP | 2007175476 A | 7/2007 | |
| JP | 2008538850 A | 11/2008 | |
| JP | 2009074746 A | 4/2009 | |
| JP | 2009183354 A | 8/2009 | |
| JP | 2010240258 A | 10/2010 | |
| JP | 2011014281 A | 1/2011 | |
| JP | 2011204824 A | 10/2011 | |
| JP | 2011211896 A | 10/2011 | |
| JP | 2013198730 A | 10/2013 | |
| JP | 2015168357 A | 9/2015 | |
| WO | WO-9811397 A1 | 3/1998 | |
| WO | WO9913562 | 3/1999 | H02N 2/00 |
| WO | WO2007078048 | 7/2007 | A45D 1/04 |
| WO | WO2008027928 | 3/2008 | H01J 1/02 |
| WO | WO2009102706 | 8/2009 | H01L 35/34 |
| WO | WO2010078521 | 7/2010 | H01L 35/34 |
| WO | WO-2010108254 A1 | 9/2010 | |
| WO | WO2010150162 | 12/2010 | A45D 2/48 |
| WO | WO-2012037031 A1 | 3/2012 | |
| WO | WO-2014052145 A1 | 4/2014 | |
| WO | WO-2015066518 A1 | 5/2015 | |

OTHER PUBLICATIONS

International search report and written opinion dated Jan. 21, 2016 for PCT/US2015/059598.
International search report and written opinion dated Jan. 29, 2014 for PCT/US2013/060549.
International search report and written opinion dated Apr. 22, 2016 for PCT/US2016/017603.
Office Action dated Feb. 1, 2016 for U.S. Appl. No. 13/541,530.
Office action dated Mar. 21, 2016 for U.S. Appl. No. 14/430,596.
Analysis of Nanonmeter Vacuum Gap Formation in Thermotunneling Devices, by E T Enikov and T Makansi, *Nanotechnology Journal*, 2008.
Australian Examination Report No. 1 issued in related application No. 2011302303, dated Aug. 19, 2013 (4 pgs).
*Bismuth Telluride ($Bi_2Te_3$)Nanowires: Synthesis* by Cyclic Electrodeposition/Stripping, Thinning by Electrooxidation, and Electrical Power Generation, E. J. Menke et al, Langmuir 2006, 22, 10564-10574, Jun. 30, 2006.
*Complex Thermoelectric Materials*, by G. J. Snyder and E. S. Tober, Nature Materials, vol. 7 Feb. 2008.
*Design and Characterization of Thin Film Microcoolers*, Chris LaBounty, Ali Shakouri, John E. Bowers, Journal of Applied Physics, vol. 89, No. 7, Apr. 1, 2001.
*Efficient Switched Thermoelectric Refrigerators for Cold Storage Applications*, By Ghoshal and Guha, Journal of Electronic Materials, vol. 38, No. 7, 2009 (6 pgs).
*Electronic Properties of Bismuth Nanowires*, By Stephen B. Cronin et al., Dept of Physics, Electrical Engineering and Computer Science, Chemistry and Francis Bitter Magnet Laboratory, Massachusetts Institute of Technology, Cambridge, MA 02139.
*Electroplating of Conformal Electrodes for Vacuum Nanogap Tunnel Junction*, By Jangidze et al., Tbilisi State University, Chavchavadze Ave. 13, 0179, Georgia, Nov. 2008, pp. 1-11.
European Communication, dated Jun. 1, 2011, Appln. No. 07 814 511.7-2208 (3 pgs).
European Communication, dated May 27, 2011, Appln. No. 07 756 398.9-2208 (3 pgs).
European Supplementary Search Report, dated Oct. 22, 2010, Appln No. 077814511.7-2208/2057659, PCT/US2007077042 (8 pgs).
International Preliminary Report on Patentability issued in related application No. PCT/US2012/045443, dated Jan. 16, 2014 (6 pgs).
International Preliminary Report on Patentability issued in related application No. PCT/US2012/071838, dated Jul. 17, 2014 (7 pgs).
International Preliminary Report on Patentability, PCT/US07/07042, Mar. 12, 2009 (4 pgs).
International Search Report and Written Opinion issued in PCT/US07/77042, dated Sep. 5, 2008. (3 pgs).
International Search Report and Written Opinion issued in PCT/US2011/051227 dated Dec. 23, 2011 (11 pgs).

(56) References Cited

OTHER PUBLICATIONS

International Search Report and Written Opinion issued in related application No. PCT/US2013/050378, dated Dec. 30, 2013 (8 pgs).
International Search Report and Written Opinion, PCT/US07/60871, Jan. 22, 2007 (7 pgs).
International Search Report and Written Opinion, PCT/US09/69959, Mar. 15, 2010 (9 pgs).
International Search Report issued for PCT/US2012/045443, dated Oct. 1, 2012 (9 pgs).
Lauterbach, "Smart Clothes Self-Powered by Body Heat," Avantex Symposium, 2002 (8 pgs).
McCarthy et al., "Enhancing Thermoelectric Energy Recovery via Modulations of Source Temperature for Cyclical Heat Loadings," Journal of Heat Transfer, Jun. 2007, vol. 129, pp. 749-755 (7 pgs).
*Measurements of Cooling by Room Temperature Thermionic Emission Across a Nanometer Gap*, by Y. Hishinuma, T.H. Geballe, B.Y. Moyzhes, and T.W. Kenny, Journal of Applied Physics, vol. 94, No. 7, Oct. 1, 2003.
Mexican Office Action (w/o translation) issued in related application No. MX/a/2013/002569, dated Jun. 13, 2013 (3 pgs).
Mexican Office Action issued in related application No. MX/a/2013/009378, dated Mar. 27, 2014 (2 pgs).
*Micron-gap ThermoPhotoVoltaics (MTPV)*, by R. DiMatteo, P. Greiff, D. Seltzer, D. Meulenberg, E. Brown, E. Carlen, K. Kaiser, S. Finberg, H. Nguyen, J. Azarkevich, P. Baldasaro, J. Beausang, L. Danielson, M. Dashiell, D. DePoy, E. Ehsani, W. Topper, K. Rahner, R. Siergie, Thermophotovoltaic Generation of Electricity Sixth Conference, American Institute of Physics, 2004.
*Multilayer Thermionic Refrigerator*, By G.D. Mahan, J.A. Sofao and M. Bartkoiwak, Journal of Applied Physics, vol. 83, No. 9, May 1, 1998.
Notice of Allowance issued in related U.S. Appl. No. 13/101,015, dated Jul. 24, 2014 (23 pgs).
Office Action issued in related U.S. Appl. No. 13/101,015, dated Nov. 4, 2013 (50 pgs).
Office Action issued in related U.S. Appl. No. 13/394,288, dated Nov. 14, 2013 (26 pgs).
Office Action issued in related U.S. Appl. No. 13/394,288, dated Aug. 18, 2014 (8 pgs).
Office Action issued in related U.S. Appl. No. 13/394,288, dated Jun. 12, 2014 (18 pgs).
Office Action issued in related U.S. Appl. No. 13/394,288, dated Mar. 18, 2014 (12 pgs).
Office Action issued in related U.S. Appl. No. 13/101,015, dated Mar. 21, 2014 (24 pgs).
Official Action issued in U.S. Appl. No. 12/376,254, dated Jun. 29, 2011 (23 pgs).
Official Action issued in related U.S. Appl. No. 12/302,782 dated Apr. 7, 2011 (16 pgs).
PCT International Search Report and the Written Opinion issued for PCT/US2012/071838, dated Mar. 8, 2013 (10 pgs).
*Possible Cooling by* Resonant Fowler-Nordheim Emission, A.N. Korotkov and K.K. Likharev, Applied Physics Letters, vol. 75, No. 16, Aug. 23, 1999.
*Quantum, Cyclic, and Particle-Exchange Heat Engines*, Humphrey et al., Physica E29, 390-398, 2005.
*Refrigeration by Combined Tunneling and Thermionic Emission in a Vacuum: Use of Nanometer Scale Design*, by Y. Hishinuma, T.H. Geballe, B.Y. Moyzhes, Applied Physics Letters, vol. 78, No. 17, Apr. 23, 2001.
*Selective Epitaxial Growth of SiGe on a SOI Substrate by Using Ultra-High Vacuum Chemical Vapor Deposition*, by H. Choi, J. Bae, D. Soh, and S. Hong, Journal of the Korean Physical Society, vol. 48, No. 4, Apr. 2006, pp. 648-652.
*Skin Cooling Surfaces: Estimating the Importance of Limiting Skin Temperature*, By Charles Lachenbruch, Ostomy Wound Management. Feb. 2005 (8 pgs).
*Strain relaxation of SiGe Islands on Compliant Oxide*, by H. Yin et al., Journal of Applied Physics, vol. 91, No. 12, Jun. 15, 2002.

*Substrate-Mediated Photo Induced Chemical Reactions on Ultrathin Metal Films*, V.P. Zhdanov, B. Kasemo, Department of Applied Physics, Apr. 19, 1999, Surface Science 432 (1999) L599-L603.
*The Thermoelectric Properties and Crystallography of Bi—Sb—Te—Se Thin Films Grown by Ion Beam Sputtering*, by H. Noro, K. Sato, and H. Kagechika, Journal of Applied Physics, 73 (3) 1 Feb. 1993.
*Thermal and electrical properties of Czochralski grown GeSi single crystals*, by I. Yonenaga et al. Journal of Physics and Chemistry of Solids 2001.
*Thermionic Refrigeration*, by G.D. Mahan, Journal of Applied Physics, vol. 76, No. 7, Oct. 1, 1994.
*Thermotunneling Based on Cooling Systems for High Efficiency Buildings*, by Marco Aimi, Mehmet Arik, James Bray, Thomas Gorczyca, Darryl Michael, and Stan Weaver General Electric Global Research Center, DOE Report Identifier DE-FC26-04NT42324, 2007.
*Vacuum Thermionic Refrigeration with a Semiconductor Heterojunction Structure*, by Y. Hishinuma, T.H. Geballe, B.Y. Moyzhes, Applied Physics Letters, vol. 81, No. 22, Nov. 25, 2002.
Extended European Search Report issued in related application No. 11825739.3, dated Nov. 18, 2014 (11 pgs).
Office Action issued in related U.S. Appl. No. 13/394,288, dated Oct. 16, 2014 (7 pgs).
Philippines Office Action issued in related application No. 1/2013/500025, dated Nov. 6, 2014 (2 pgs).
Co-pending U.S. Appl. No. 14/934,757, filed Nov. 6, 2015.
European Office Action dated Apr. 1, 2015 for Application No. 13828204.1.
European Search Report and Written Opinion dated Apr. 2, 2015 for Application No. 12807127.1.
European Search Report and Written Opinion dated Oct. 12, 2010 for EP Application No. 07556398.9.
International Preliminary Report on Patentability dated Feb. 10, 2015 for PCT Application No. US2013/050378.
International Preliminary Report on Patentability dated Jul. 14, 2011 for PCT Application No. US2009/069959.
International Search Report and Written Opinion dated Feb. 11, 2015 for PCT Application No. US2014/063511.
International Search Report and Written Opinion dated Apr. 15, 2009 for PCT Application No. US2007/060871.
International Search Report and Written Opinion dated Apr. 17, 2009 for PCT Application No. US2009/033660.
Notice of allowance dated Jun. 29, 2011 for U.S. Appl. No. 12/302,782.
Notice of allowance dated Sep. 7, 2012 for U.S. Appl. No. 12/367,965.
Notice of allowance dated Sep. 15, 2008 for U.S. Appl. No. 11/344,622.
Notice of allowance dated Nov. 21, 2011 for U.S. Appl. No. 12/376,254.
Office Action dated Feb. 17, 2015 for U.S. Appl. No. 13/541,530.
Office action dated Mar. 15, 2012 for U.S. Appl. No. 12/367,965.
Office Action dated Mar. 23, 2015 for U.S. Appl. No. 13/394,288.
Office Action dated Mar. 24, 2015 for U.S. Appl. No. 13/728,794.
Office action dated May 21, 2012 for U.S. Appl. No. 13/330,345.
Office action dated Nov. 13, 2015 for US Application No. 13/394,288.
Philippines Examination Report dated Apr. 8, 2015 for Application No. 1/2013/500025.
Chinese Office Action (with translation) issued in application No. 201280033604.5, dated Jun. 16, 2015 (25 pgs).
Indonesian Office Action (no translation) issued in application No. W00201301075, dated Jun. 30, 2015 (2 pgs).
Office Action issued in U.S. Appl. No. 13/541,530, dated Jul. 30, 2015 (26 pgs).
Office Action issued in U.S. Appl. No. 13/940,093, dated Jul. 31, 2015 (56 pgs).
Chinese Office Action (with translation) issued in application No. 201180043196.7, dated Apr. 3, 2015 (34 pgs).
European Office Action issued in related application No. 13828204.1, dated Apr. 1, 2015 (3 pgs).
European Search Report issued in related application No. 12807127.1, dated Apr. 2, 2015 (10 pgs).

(56) References Cited

OTHER PUBLICATIONS

International Preliminary Report on Patentability, PCT/US13/050378, dated Feb. 19, 2015 (7 pgs).
International Search Report and Written Opinion, PCT/US14/63511, dated Feb. 11, 2015 (9 pgs).
Office Action issued in related U.S. Appl. No. 13/394,288, dated Mar. 23, 2015 (20 pgs).
Office Action issued in related U.S. Appl. No. 13/541,530, dated Feb. 17, 2015 (31 pgs).
Office Action issued in related U.S. Appl. No. 13/728,794, dated Mar. 24, 2015 (62 pgs).
Philippines Examination Report issued in related application No. 1/2013/500025, dated Apr. 8, 2015 (2 pgs).
Notice of Allowance dated Nov. 9, 2016 for U.S. Appl. No. 13/541,530.
Notice of Allowance dated Dec. 28, 2016 for U.S. Appl. No. 13/940,093.
Office Action dated Oct. 21, 2016 for U.S. Appl. No. 13/400,093.
Office Action dated Jun. 13, 2017 for U.S. Appl. No. 14/473,882.
Co-pending U.S. Appl. No. 15/662,534, filed Jul. 28, 2017.
Extended European Search Report and Search Opinion dated Jun. 30, 2017 for European Patent Application No. EP14859204.1.
International Search Report and Written Opinion dated Jul. 24, 2017 for International PCT Patent Application No. PCT/US2017/032959.
Co-pending U.S. Appl. No. 15/970,104, filed May 3, 2018.
Evidentiary Reference "3MESH specification sheet".
Notice of allowance dated Feb. 7, 2018 for U.S. Appl. No. 14/473,882.
Office action dated Apr. 9, 2018 for U.S. Appl. No. 14/934,757.
European search report and opinion dated May 19, 2016 for Application No. 13828204.1.
International search report and written opinion dated Jun. 17, 2016 for PCT/US2016/019743.
Office action dated Jun. 3, 2016 for U.S. Appl. No. 13/940,093.
Office Action dated Jun. 29, 2016 for U.S. Appl. No. 13/394,288.

* cited by examiner

Pillar Pattern from Two Bonded Foam Layers

Computer Aided Analysis of Airflow for Pillar Geometries

Wire Cut of Pillar Geometries

Designs for a more Planar Surface

Designs for hiding irregular surface from view and from feel
8(a) Embossed and Stitched Fabric
8(b) Embossed Leather Relationship of Temperature on Plant Production Diagram of thermoelectric panel for heating and cooling a battery

THERMOELECTRIC STRING, PANEL, AND COVERS FOR FUNCTION AND DURABILITY

CROSS REFERENCE TO RELATED APPLICATIONS

This application claims priority from U.S. Provisional Application Ser. No. 61/899,665 filed Nov. 4, 2013, 61/939,619 filed Feb. 13, 2014, and 62/019,849 filed Jul. 1, 2014. The contents of all of the aforesaid applications are incorporated herein by reference.

BACKGROUND OF THE INVENTION

In our earlier U.S. patent application Ser. No. 13/101,015 filed May 4, 2011 and Ser. No. 13/394,288 filed Mar. 5, 2012 and PCT Application Serial No. PCT/US11/51227 filed Sep. 12, 2011 and PCT Application Serial No. PCT/US13/050378 filed Jul. 12, 2013, we describe a thermoelectric heating and cooling system comprising a connected string of thermoelectric elements woven into an insulating panel, which may be comprised of a soft material like foam, memory foam, batting, or natural fabrics. A conductor material is expanded on either side of the panel to distribute heat on one side and cooling on the other. Such a material or surface upgraded with thermoelectric heating and cooling in this manner is called a distributed thermoelectric panel. In our earlier applications, integration of that insulating panel with mattresses, chairs, and blankets was also described. The end result was a relatively low cost, distributed heating and cooling addition to bedding, seats, blankets, electronics, and other products.

SUMMARY OF THE INVENTION

The present invention provides various enhancements and improvements to heated and cooled products and their components over the prior art. The present invention introduces new designs for heated and cooled office cushions, battery thermal management systems, and plant soil temperature control systems. In addition, the present invention provides improvements to the design of the thermoelectric string that increases durability of the office cushion and other improvements that increase the cushion's tactile and visual appeal.

More particularly, in accordance with the present invention, we provide a heated and cooled office cushion for improving comfort and saving energy, a heated and cooled planting pot for controlling soil temperature and improving plant productivity, and a battery thermal management system for improving battery power and safety. We also provide various designs of strain reliefs for the thermoelectric string that increase its durability when combined with a seat cushion and used for long periods. Finally, we provide patterned designs of the cushion's cover and foam surface to improve both tactile feel and visual appearance of the cushion.

More particularly, we provide a thermoelectric cooling device comprising a thermoelectric string inserted into a multi-layer foam stack wherein a first layer is optimized for softness and a second layer is optimized for softness and airflow combined. In one embodiment, the thermoelectric cooling device is incorporated into a seat cushion including a fan and electrical power source.

In one embodiment the device includes one or more of the following features: a battery for temporary cordless operation, an occupancy switch that turns off the device when not in use, a means for varying magnitude and polarity of the voltage or current applied to the thermoelectric string, an electronics enclosure.

In another embodiment the device allows the airflow to exit in multiple directions to compensate for blockage in one direction.

In yet another embodiment the second layer has pillars to allow airflow therebetween. In such embodiment the pillars' cross-section preferably is circular, square, hexagonal, or octagonal. Also, the pillars preferably are formed by molding, by routing, or by linear wire cutting, wherein the wire cutting preferably employs a hot wire, an abrasive wire, or a vibrating wire. Also, if desired, the pillars may be staggered from one row to a next row to maximize uniformity of airflow.

In one embodiment the thermoelectric string further comprises a strain relief to prevent breaking of the string's wires during repeated and long term use. In such embodiment the strain relief preferably is a foam plug that encapsulates the thermoelectric elements and has channels for the string's wires to exit the plug, wherein the foam plug preferably has a Y cut shape or a drilled hole. In another embodiment the device comprises tubing and flaps or nipples of latex, rubber, silicone, Teflon, polyurethane, or plastic, optionally combined with another material to insulate the link wires that connect the thermoelectric elements.

In yet another embodiment the strain relief comprises tape attached along the string and extending beyond the thermoelectric elements wherein the tape is comprised of foam, rubber, plastic, Teflon, gel, or a solidifying liquid. In such embodiment, the tape preferably includes fibers for increasing its tensile strength wherein the fibers are glass, nylon, or cloth.

In another embodiment the strain relief comprises cloth woven together with the wire strands.

In another embodiment a plane of the thermoelectric elements and emanating wires in the first foam layer intersects a surface of the device at an angle substantially less than 90 degrees.

In such embodiment, the thermoelectric elements preferably are placed directly above the pillars or above and between the pillars.

In another embodiment, the strands of the woven wire on the surface are shaped to increase their ability to lengthen or otherwise move under stress.

In another embodiment the wires of thermoelectric string are placed in the foam layers such that stress cycles during use avoid a plastic deformation regime of the bending of the wires.

Alternatively, the thermoelectric elements are placed underneath a flap of foam in the first foam layer.

In one embodiment material is added between the stranded wires along the surface to make the surface smoother. In such embodiment the material preferably is matched in firmness or profile height or both to the stranded wires.

In one embodiment the device is covered by a textured material comprising textile, rubber, vinyl, leather, or other seat covering material. In such embodiment the texture is formed by embossing, or additional stitching. Also, in such embodiment the dimensions and separation of the texture features preferably closely match dimensions and separation of the stranded wires, In one embodiment, the device is incorporated into the perimeter of a pot containing soil for plants.

In such embodiment the thermoelectric panel preferably is sandwiched between two walls of the pot, and airflow optionally is outside the sandwich of either natural or forced convection.

In one embodiment, the device is incorporated into the outside of a battery for thermal management, or is combined with a heat spreader to move the airflow layer to another location. In such other embodiment, the heat spreader preferably comprises fluid flow or phase change materials.

DETAILED DESCRIPTION OF THE INVENTION

In a prior PCT Application Serial No. PCT/US13/050378 filed Jul. 12, 2013, the inventors described how an array of foam pillars underneath a thermoelectric panel could allow for airflow across heat exchangers made from braided or stranded wire. The pillars, attached to the insulating foam layer, permit independent vertical movement thereby distributing pressure evenly. The inventors shown in PCT Application Serial No. PCT/US13/050378 filed Jul. 12, 2013 that this construction could retain the pressure distribution characteristics of whatever cushioning was underneath, which is a significant feature for a generalized heating/cooling layer that may be applied to a variety of surfaces.

In this application, we show methods for manufacturing the pillars and optimizing their shape, protecting the wire and thermoelectric elements from cyclic stress, smoothing the surface, and constructing an entire heated and cooled cushion using a small number of parts with low manufacturing costs.

Figure 1A:
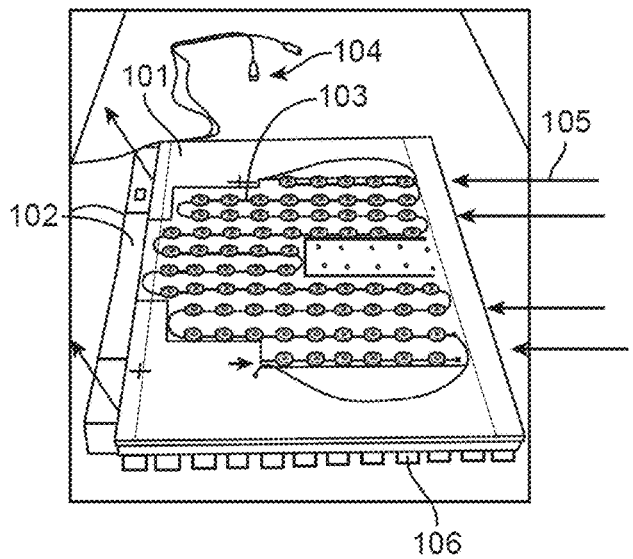
FIGS. 1(a), 1(b), 1(c) and 1(d) show the interior parts of a low-cost cushion for use in offices and homes to improve comfort and save energy on central heating and cooling.
Figure 1B:
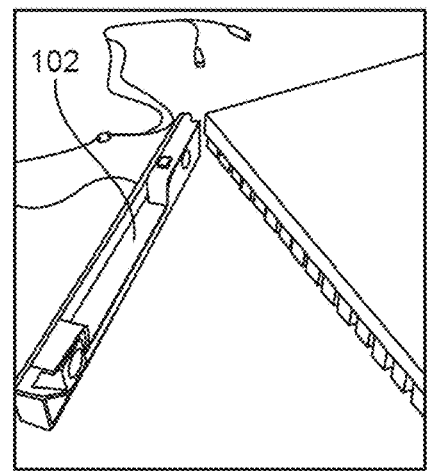
Figure 1C:
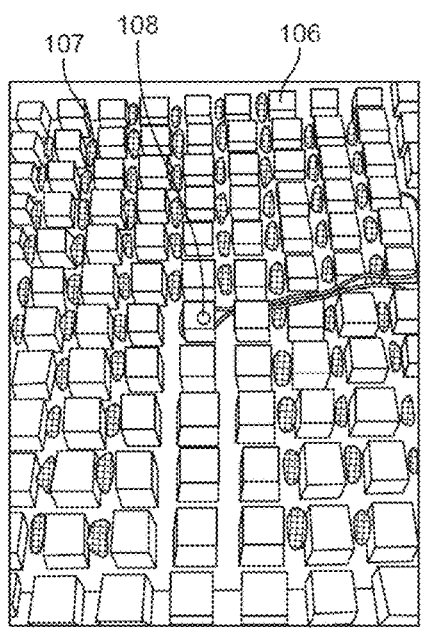
Figure 1D:
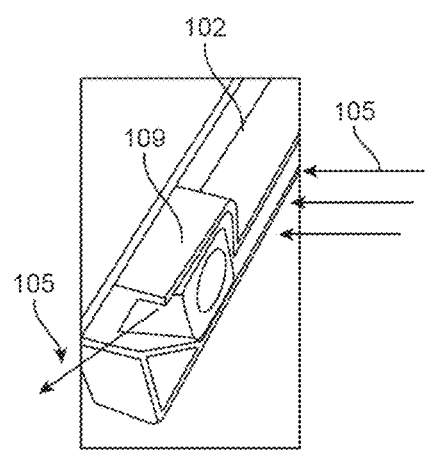

FIGS. 1(a)-1(d) show the internals of a completed form-factor cushion. FIG. 1a shows the two layers 101 and 106 of foam arranged as described in PCT Application Serial No. PCT/US13/050378 and having the thermoelectric string 103 inserted into the top layer, and pillars 106 in the bottom layer. The heat exchangers 107 made from stranded wire are exposed in the airflow layer as shown in the underside view of FIG. 1c. The red button 108 in the center of FIG. 1c is a pushbutton switch that acts as an occupancy switch to turn on the heating or cooling when a user is sitting or lying down on the cushion. Without limitation, an occupancy sensor could replace the switch. Such a sensor inputting to control electronics could perform the same function.

FIG. 1b shows the electronics enclosure 102 at the back of the cushion separated from the panel. This enclosure contains or may contain the fans 109, airflow ducting 105, control electronics, wiring 104, power connectors, switches, knobs, and batteries. The fans 109 pull air 105 from the front of the cushion shown by the arrows in FIG. 1a. As shown in FIG. 1c, the fans push the air 105 upward but diagonally away from the user assuming the user is in the sitting position as shown in the close up view in FIG. 1c.

Figure 2:
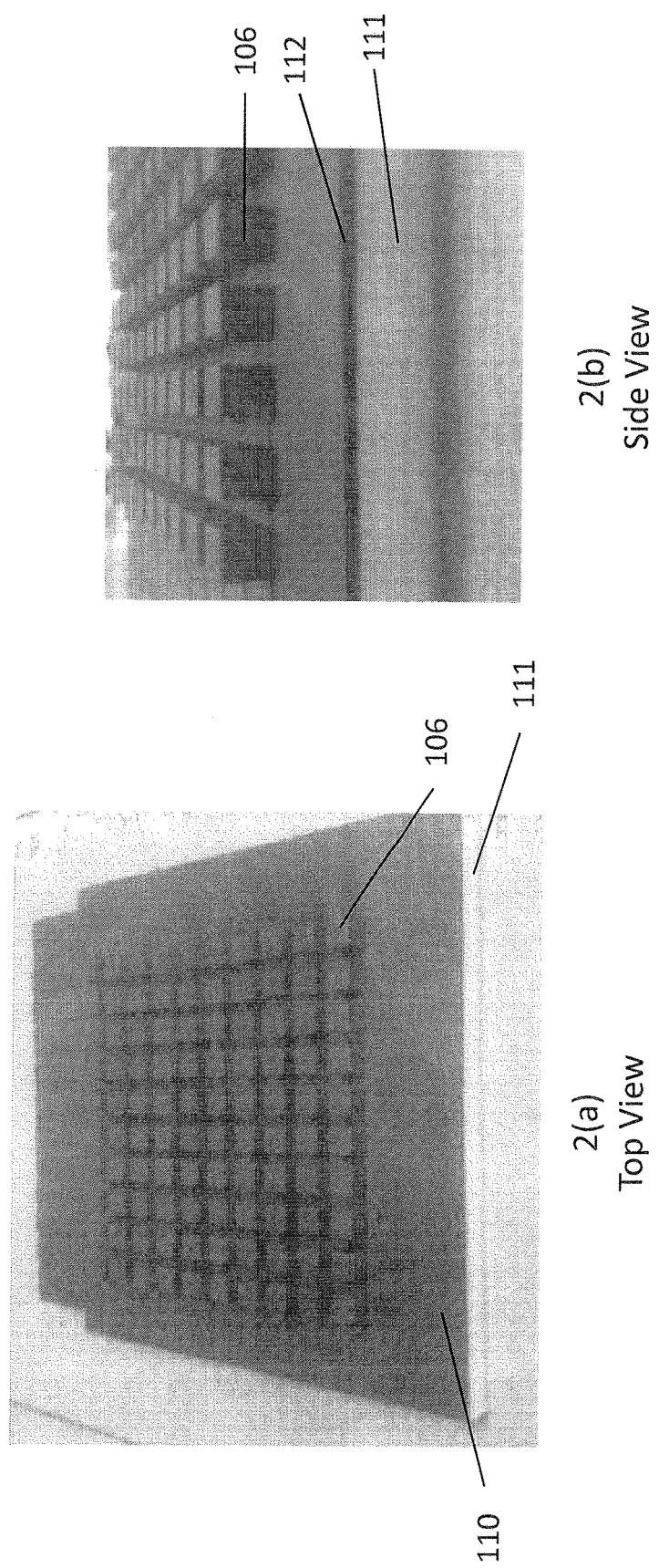
FIGS. 2(a) and 2(b) show the two-layer foam construction comprising the insulating panel and the airflow layer for use in the cushion.

FIGS. 2(a)-2(b) show two views of a manufactured, dual-layer foam stack with one layer 112 and 106 patterned with pillars. First, the optimum type of foam for the continuous layer 111 is selected for comfort and feel, as this layer will become the foam surface of the cushion. Next, the optimum type of foam for the pillared layer 112 and 106 is selected to allow airflow when under pressure of the user. To begin the manufacture, two continuous layers of each type of foam are bonded together. Then, the pillars are formed. FIGS. 2(a)-2(b) show the pillars formed using a router machine, which routs out the channels between the pillars. Without limitation, the pillars can also be formed using a hot wire cut machine, wherein the hot wire traverses a U shaped path to construct a channel. Without limitation, many hot wires could be employed simultaneously to increase throughput. Also without limitation, the patterned pillars 106 and 112 in FIGS. 2(a)-2(b) could be formed in a mold as the foam is produced. The continuous layer 111 could be formed in place on top of the pillared layer 112 and 106, or be bonded afterwards.

Figure 3:
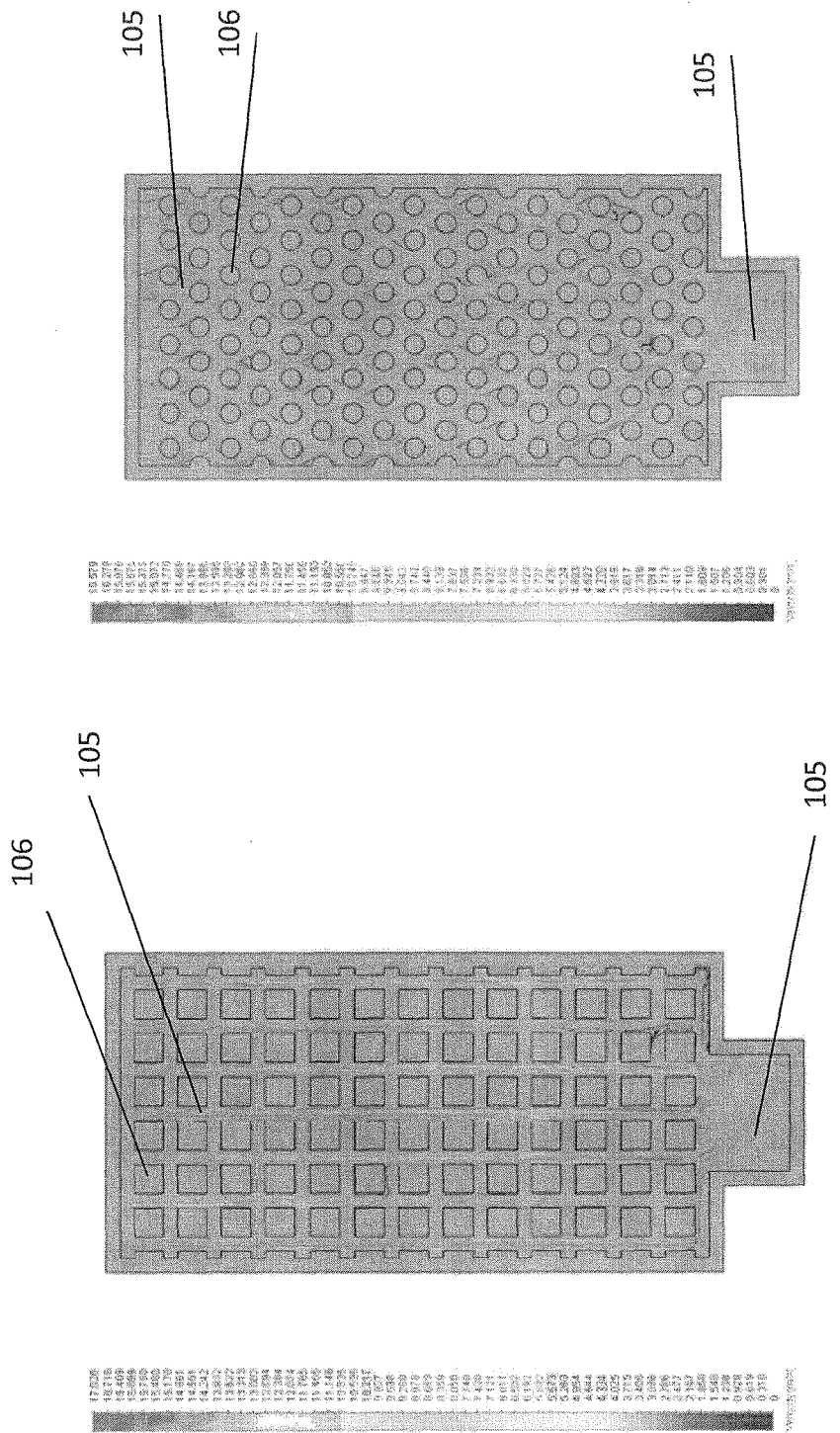
FIGS. 3(a) and 3(b) show simulation results of the airflow distribution for two designs of the airflow layer for use in the cushion.

Analysis and simulations performed by the inventors indicate that square pillars 106 like the ones in FIGS. 2(a)-2(b) are not the optimal shape for airflow. Staggered round pillars 106 allow more uniform airflow 105, as indicated in the computer-aided analysis illustrated in FIGS. 3a and 3b.

Figure 4:
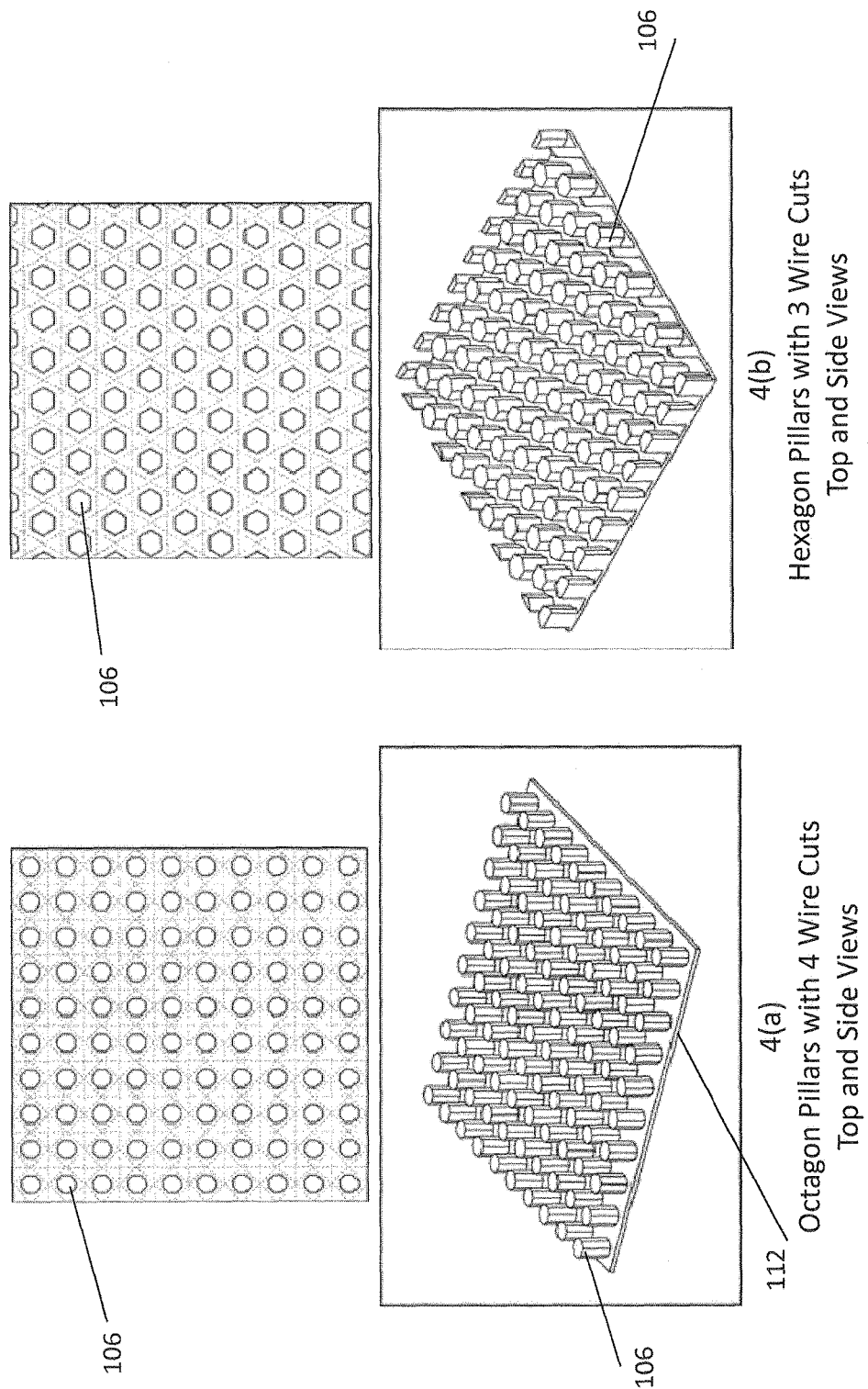
FIGS. 4(a) and 4(b) show how round pillars for the airflow layer may be approximated by making linear cuts to the foam in the airflow layer for use in the cushion.

FIGS. 4(a)-4(b) show how a round pillar may be approximated using a hot wire cut machine. FIG. 4a shows how 4 hot-wire cut directions along the dotted lines can form octagonal pillars 106 with remaining foam base material 112. FIG. 4b shows how 3 hot-wire cut directions along the dotted lines can form hexagonal pillars 106. Without limitation, the hot wire cut operation could be replaced with an abrasive wire saw or vibrating operation. FIGS. 5(a)-5(e) show many different design enhancements to the base thermoelectric string to protect the wires from breakage after repeated bending cycles when in the cushion after numerous sitting cycles. The objective of these enhancements is to limit the bend radius of the wire during the bending cycles.

It has been known for a long time in the industry that putting a lower bound on the bend radius of a wire can increase its bend cycle life by several orders of magnitude.

Figure 5E:
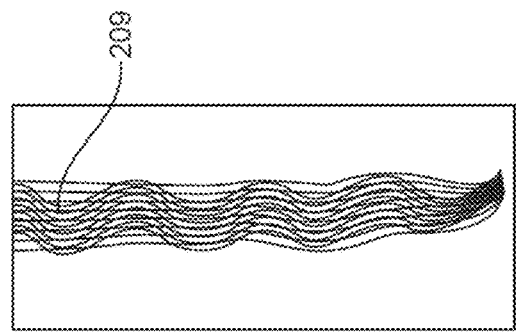
FIGS. 5(a), 5(b), 5(c), 5(d) and 5(e) show various designs for strain relief of the thermoelectric string to improve its durability when combined with the cushion and used for a long period of time.
Figure 5B:
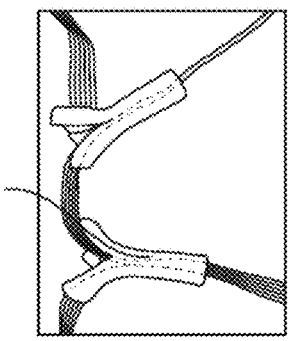
Figure 5D:
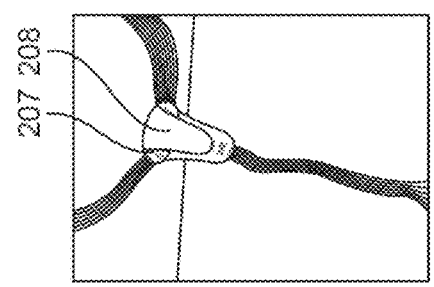
Figure 5A:
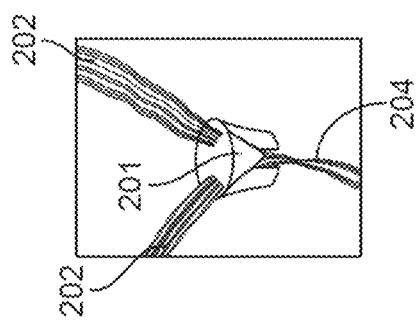

FIG. 5a shows a closed-cell foam plug in the shape of a cylinder 201. Without limitation, the plug may have a Y shape cut in the side for placement of the thermoelectric junction. Or, the plug may have a hole in the center and the junction inserted into the hole from above. The Y cut or the hole allows a path for the two links 202 and the one loop 204 of the thermoelectric junction to exit the foam plug. The hardness of the foam is selected to result in a gradual but not severe bending of the wire under compression from directly above. The attachment of the wire to the junction is protected inside the foam plug by preventing acute bending at this location. Without limitation, the material used for this purpose could be closed cell foam, open cell foam, Styrofoam, rubber, plastic, or gel.

FIG. 5b shows another method for protecting the thermoelectric string. Here, a length of latex tubing 205 is cut partway down to form two flaps. The flaps protect the two links leaving the junction, and the tubular portion protects the loop's attachment to the junction. Without limitation, this material used for this purpose could be silicone, polyurethane, plastic, Teflon, gel, or any other similar material.

Figure 5C:
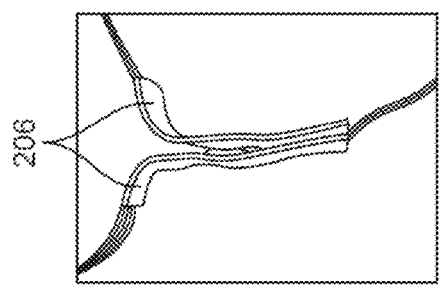

FIG. 5c shows another method for protecting the thermoelectric string. Here, lengths of fiberglass tape 206 are attached to the outside of the junction and extend along the loop and along the link to beyond the 90 degree angle at the surface. The tape adhered to the wire and junction forces a mild bend radius at all points where the tape is present. Without limitation, the material used could be foam tape, rubber tape, electrical tape, woven plastic tape, plastic tape, Teflon tape, gel tape, or any other similar material with adhesive or without such as liquid plastics that solidify after placement.

FIG. 5d shows another method for protecting the thermoelectric string. Here, a latex nipple 207, similar to those used in baby bottles, is used to limit the bend radius and protection the wire-to-board attachments. A foam plug 208 is used to maintain electrical insulation between the links. The loop wire is routed through a hole at the narrow end of the nipple. The links are routed over the wide end of the nipple. Without limitation, this nipple shape could be made of silicone, polyurethane, rubber, plastic, Teflon, gel, or any other similar material.

FIG. 5e shows a length of stranded wire 209 that is combined with cloth fibers to improve the tensile strength of the links and reduce the bending stress on the wires. When the cushion has the weight of a person's torso, the compression lengthens the surface of the foam, which in turn puts tensile stress on the links.

Now, we generalize the design of the thermoelectric ribbon further in a way that durability is achieved and is predictable. The physical process of metal wires flexing and then breaking is rooted in the repeated weakening of each bend. If the wire's strength is weakened even slightly on each cycle of stress, then breakage is likely to occur after the 3,000 to 100,000 stress cycles required for the durability of a consumer product. The slight weakening of a metal wire on each flex can be predicted by looking at its deformation. If the wire's original shape returns after the flex, then the deformation is elastic. If the wire's shape changes after the flex, then the deformation is plastic. Plastic deformation of a wire changes its physical properties and weakens the wire. Repeated plastic deformation of a wire is certain to lead to breakage. Repeated elastic deformation of a wire will last much longer. Plastic or elastic deformation is observable on a thermoelectric ribbon inserted into a panel on the first cycle of a durability test. Hence, the nature of the deformation on the first cycle of a thermoelectric panel is predictive of its durability. Further, a thermoelectric panel can be designed to only incur elastic deformation or to avoid plastic deformation, or both, as verified in the first cycle or a small number of cycles of a durability test.

Figure 6B:
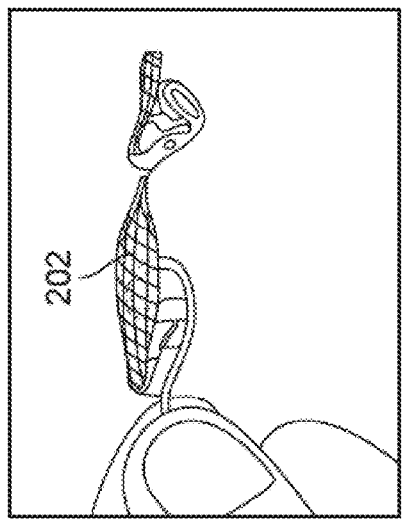
FIGS. 6(a), 6(b), 6(c), 6(d), 6(e), 6(f), 6(g) and 6(h) show a modified configuration for the thermoelectric string to improve its durability when combined with the cushion and used for a long period of time.
Figure 6D:
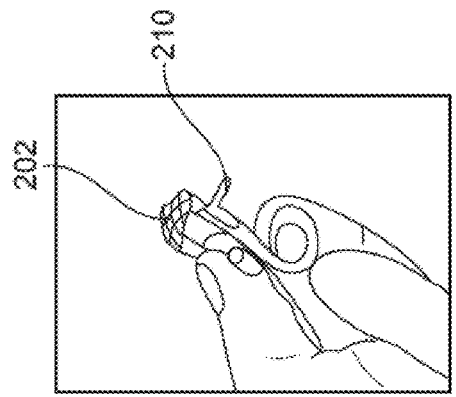
Figure 6A:
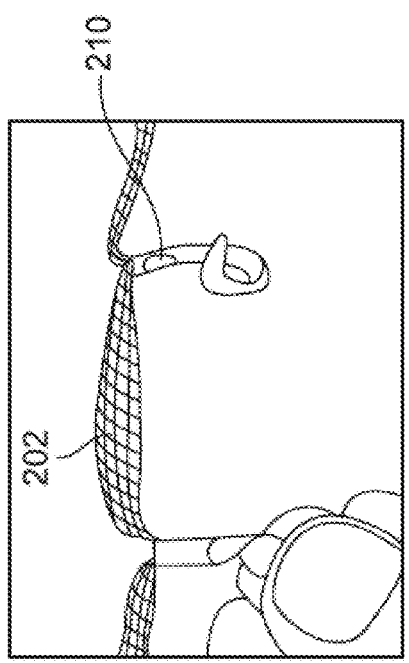
Figure 6C:
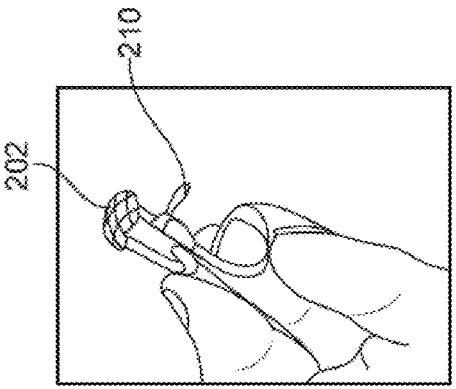

FIGS. 6(a)-6(d) show two designs of the thermoelectric ribbon, as it would appear in a panel. The panel is not shown for illustrative purposes. FIG. 6a is the traditional design with vertical junctions 210 inside the panel, horizontal links 202 along the surface of the panel, and curled heat exchangers underneath the junctions positioned in an airflow layer. After applying compression to this ribbon with an equivalent displacement of the standard durability test, the wires in the ribbon become plastically deformed as shown in FIG. 6b. FIG. 6c shows the end view of the angled design, wherein the plane containing the lines of the junctions 210 intersects at a 45-degree angle the plane of the links 202 along the surface. FIG. 6d shows the string after a stress cycle that compressed the ribbon to a very narrow vertical clearance. The resting shape of the ribbon in FIG. 6d after compression stress has returned to that of FIG. 6c, indicating the absence of plastic deformation. Without limitation, all designs of a thermoelectric ribbon that avoid plastic deformation in a cycle of stress are covered by this invention.

The angled design of FIG. 6c can be inserted into the foam panel of the cushion 101 in FIG. 1a such that the junction 210 in FIG. 6c is positioned either above the pillar 106 in FIG. 1a or between the pillars. Placing the junction above the pillar allows the junction to be cushioned by the pillar in severe compression. Placing the junction between the pillar allows the wires to bend more freely in the soft foam and hence less susceptible to plastic deformation. Both placement locations have advantages depending on the stress conditions and the spring constants of the two foam layers.

Figure 6F:
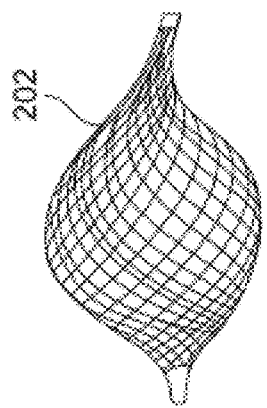
Figure 6H:
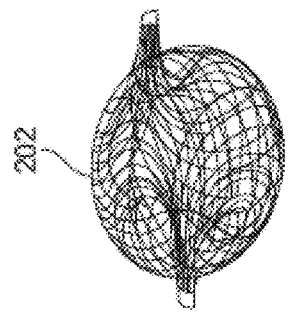
Figure 6E:
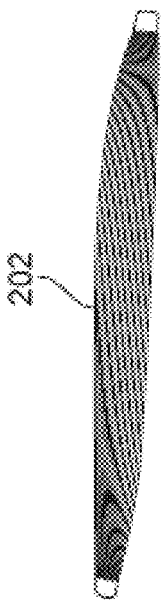
Figure 6G:
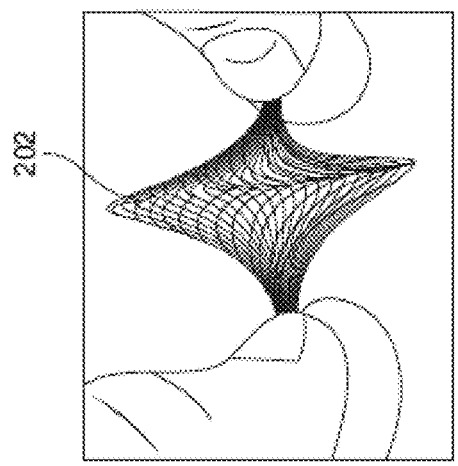

FIGS. 6e through 6f show how shaping the woven strands in link 202 can make the system more durable in a stress test. One failure mode of an office cushion occurs when the links 202 are forced to lengthen in order to accommodate the depression made in the foam when a person sits on it. With the fishnet-woven braid in FIG. 6a, the outer strands of the weave do not have sufficient slack to accommodate the necessary lengthening, which results in tensile stress on the wire strands where they join the junction. FIGS. 6f through 6h show steps in shaping the links wires to achieve more slack and hence lengthening capability under stress. First, in FIG. 6f, the terminated ends of the link 202 are pushed inwards towards each other, which creates a bulge on wires surrounding an empty cavity. Next, in FIG. 6g, the bulging section is folded into a Z shape, which shortens the length from termination to termination of the link. Then, the fold is flattened to achieve the final shape in FIG. 6h. Note how in FIG. 6h the fold lessens as the ends of the link are pulled away from each other. This slack in the link allows for further lengthening under stress of a person sitting on a cushion with these links 202 on the surface.

Figure 7:
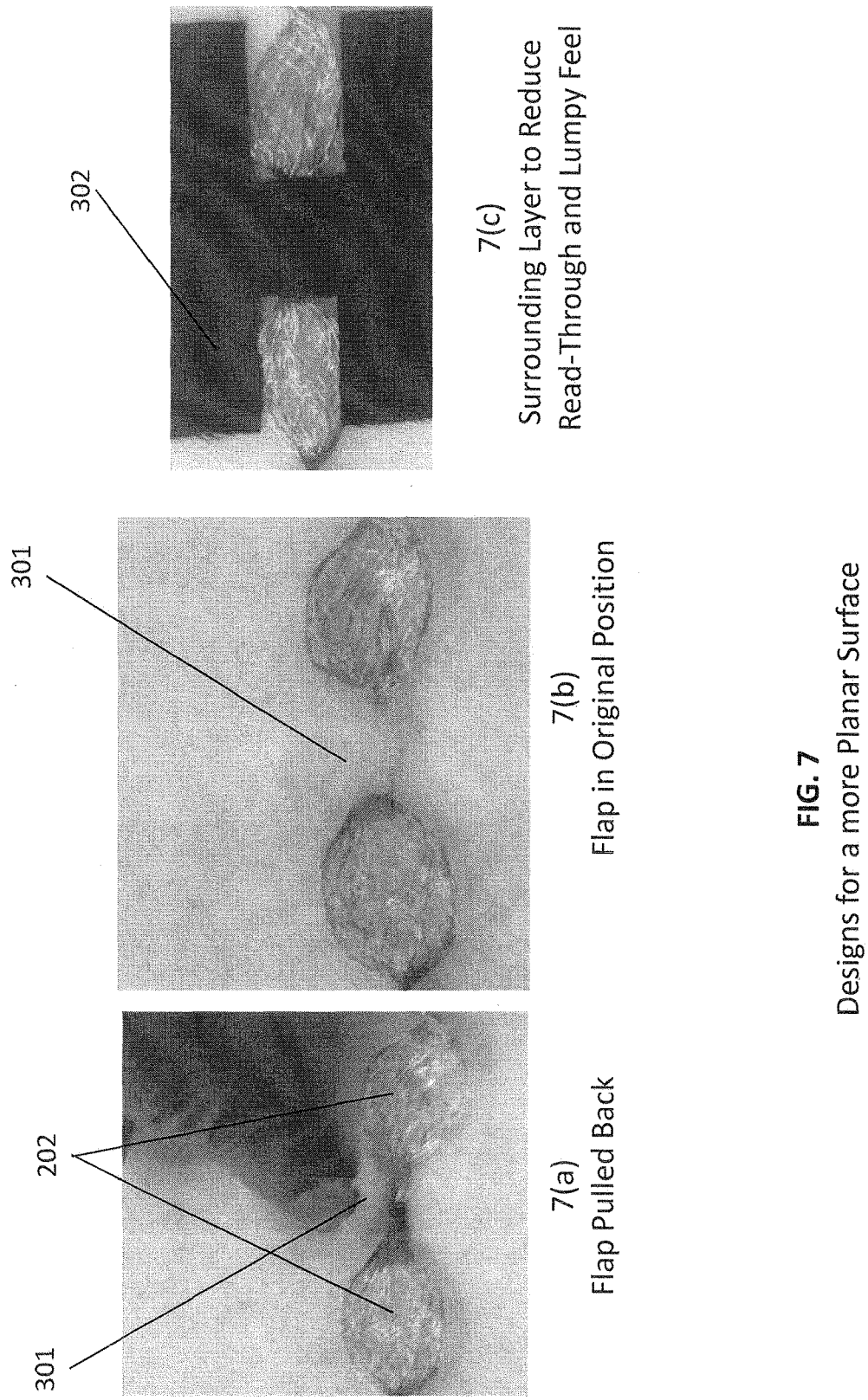
FIGS. 7(a), 7(b) and 7(c) show methods for using existing materials in the thermoelectric panel, or adding new materials, to make the surface smoother for increased visual appearance and tactile feel when combined with the cushion.

As previously mentioned, maintaining a radius of curvature of the wires is critical to prevent the wires from breaking under repeated sitting cycles of the thermoelectric panel in a cushion. Furthermore, it is desirable to make the foam surface as smooth as possible for tactile and visual appeal. FIGS. 7(a)-7(c) show a low-cost method for protecting the wire as it turns along the surface and additionally for smoothing the surface. A flap 301 is cut in the foam as shown in FIG. 7a using a U-shaped blade inserted at an angle to the surface. The flap 301 of foam is lifted up and the thermoelectric junction is inserted through to the airflow layer. Then the flap 301 is returned to it original position as shown in FIG. 7b. Now, the presence of foam both above and below the wire 202 at the point where it turns 90 degrees along the surface limits the curvature under pressure stress or rolling stress. This method of using the flap also reduces the "egg-crating" irregularity of the surface, which naturally results from the wire 202 being routed into and out of the surface foam. The surface of FIG. 7b is still irregular because of the profile height and rigidity of the wires 202 are elevated from the foam surface. This irregularity is easily seen and felt through many different types of covers. A thick cover can reduce this irregularity, but thick covers also degrade the thermal performance of the panel. Hence, a better solution is needed to smooth the surface without introducing thermal resistance. FIG. 7c shows such a method for smoothing the surface. A material 302 with the similar profile height and rigidity as the wire 202 is placed around the wire. In FIG. 7c, the material is a canvas cloth. Without limitation, any material that matches the height of the woven wire could be used. The material may be stretchy to match the hammock deformation of the underlying cushion when in use. The material may be made from, without limitation, a solid polyurethane sheet, tape, spandex cloth, closed cell foam sheet, or other suitable material.

In all of the embodiments of the thermoelectric panel in this and previous patent applications, the link wires along the surface are most effective when in close proximity to the skin of the person being heated or cooled, i.e. when the cover over the wires is thin. However, a human hand can feel these wires through a smooth thin cover and this tactile feel is undesirable. And, some covers will stretch over the wires during use and remain permanently stretched with an apparent bagginess pattern to the cover over time. Designs of covers that address these issues are covered in FIGS. 8(a)-8(b).

Figure 8:
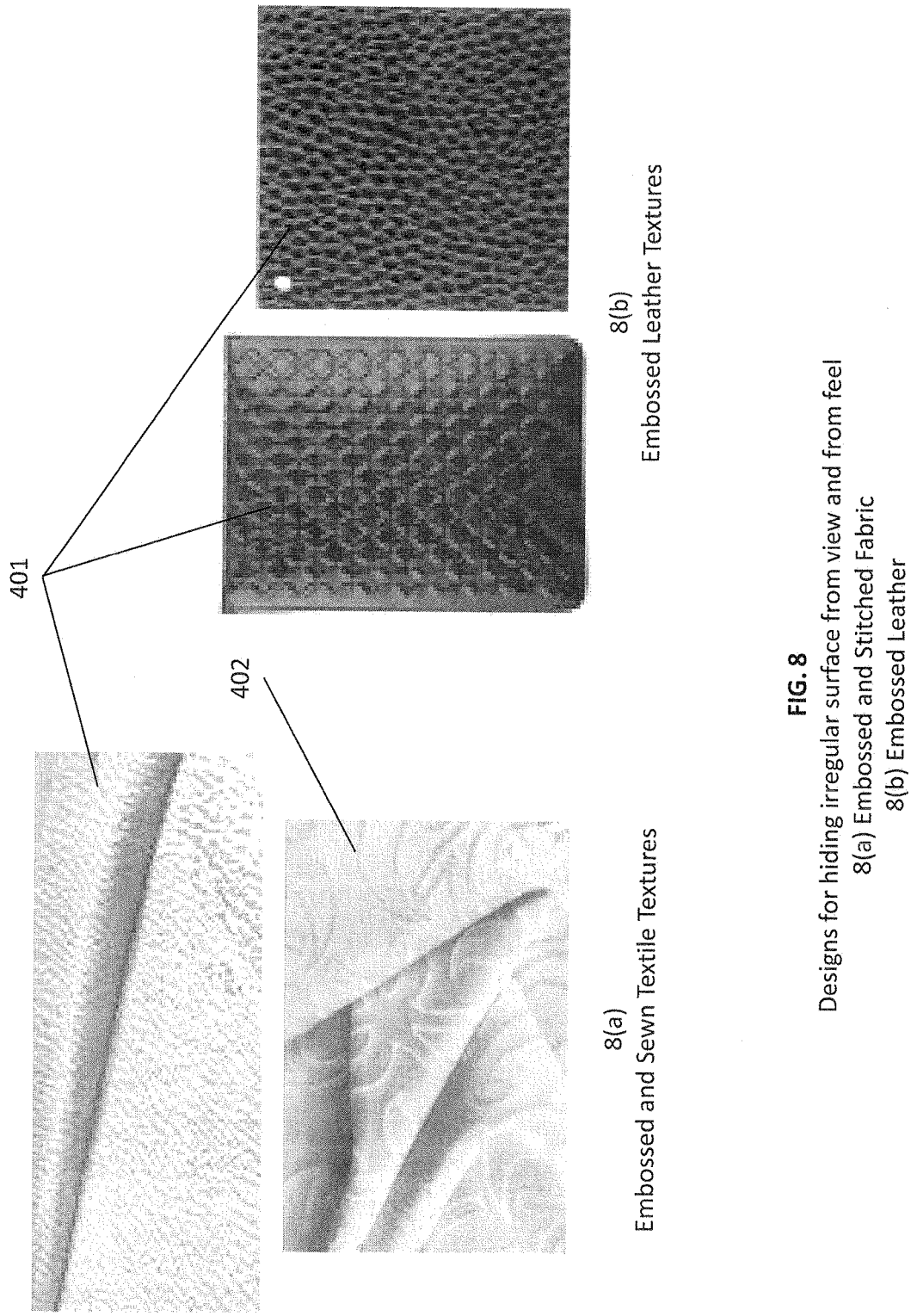
FIGS. 8(a) and 8(b) show textured covers for decoratively hiding the irregular surface appearance and feel of the thermoelectric string when covering the cushion.

FIG. 8a shows an embossed bed cover 401 and a stitched textile pattern 402, which could be used as a cover over a thermoelectric panel. This cover is made from a thin material, like a bed sheet fabric, but the embossing or stitching creates peaks and valleys in the surface contour. A human hand moving along a thermoelectric panel with this cover will not be able to distinguish the embossed or stitched peaks and valleys with the feel of the wires underneath, especially and without limitation, if the spacing and size of the embossed or stitched features is comparable with the spacing and size of the wires. These covers also visually create a pattern that is visually indistinguishable from any pattern of bagginess from the cover stretching over the wires that might occur over time. And, because the embossed fabric 401 flattens under the weight of a person and the area of the stitching in 402 is very small, the net thickness during use is very thin. Hence, these patterned fabrics address the issues with the wires under the cover, optimizing the visual appearance, the tactile feel, and the thermal performance. FIG. 8b shows several embossed patterns for leather. Again, the embossed features flatten out under the weight of a person, allowing for good thermal conduction in the contact area.

Figure 9:
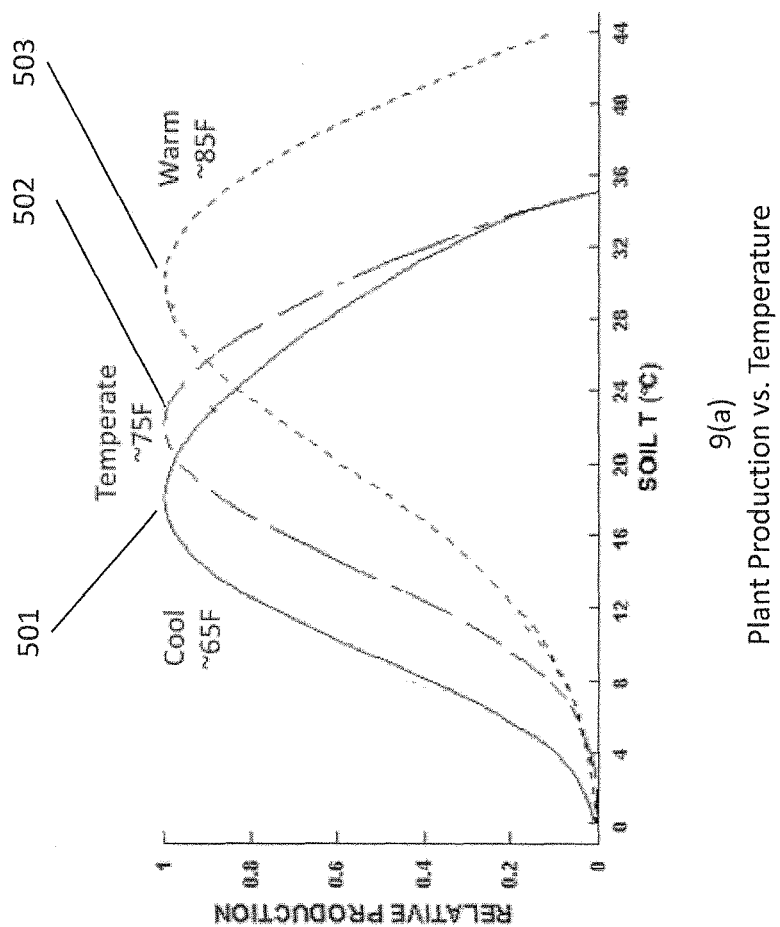
FIGS. 9(a) and 9(b) show how plant productivity is improved by controlling its soil temperature and lists the some of the plants that benefit from soil temperature control.

Another application for a thermoelectric string, panel, and possibly airflow layer is for controlling the temperature of soil for plants. FIG. 9a shows that the productivity of plants is a strong function of the soil temperature. Plants typically categorized as "cool season" plants have productivity profile 501, "temperature season" plants have productivity profile 502, and "warm season" plants have profile 503. These three profiles have optimal soil temperatures of approximately 65 F, 75 F, and 85 F respectively. FIG. 9b shows a list of plants in these three categories. It is desirable to grow warm season plants in the winter and cool season plants in the summer, and to be able to grow mixed combinations of plants in a single environment. Controlling soil temperature enables optimization of plant productivity and flexibility in the thermal environment of the plants.

Figure 10A:
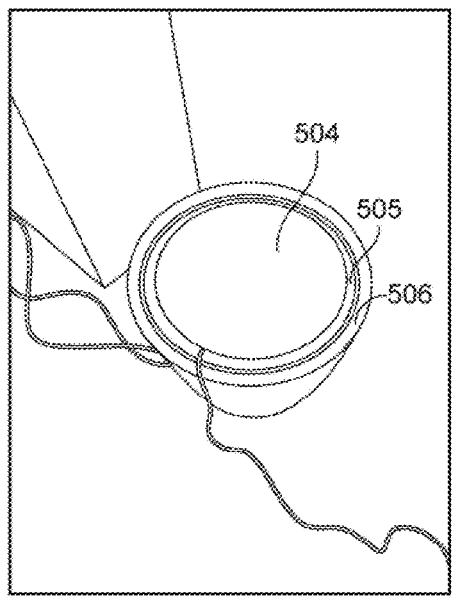
FIGS. 10(a), 10(b), 10(c) and 10(d) show an embodiment of the present invention that achieves heating and cooling of soil in a planter pot.
Figure 10B:
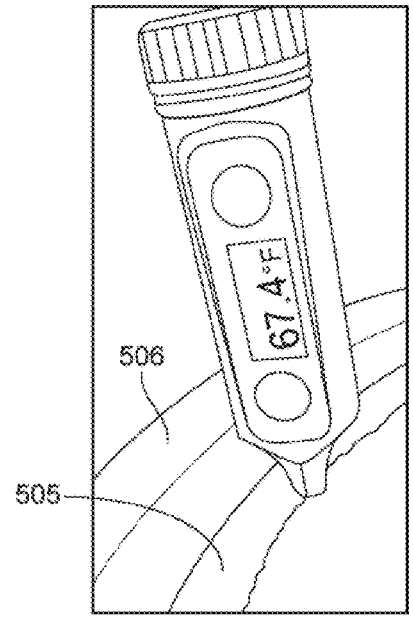
Figure 10C:
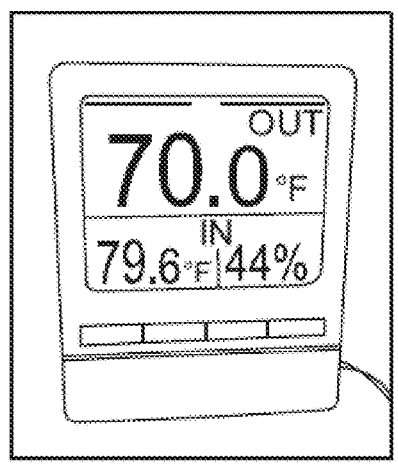
Figure 10D:
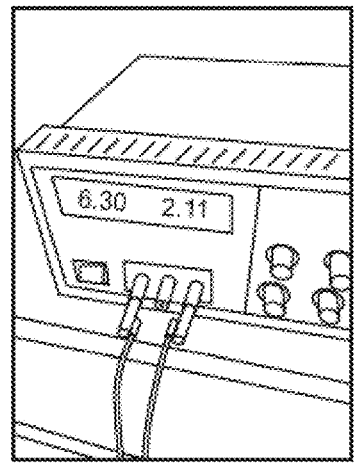

FIG. 10a shows a plant pot containing soil wherein the temperature of the soil is controlled by a thermoelectric string and panel. An insulating top layer 504 is needed to prevent heat transfer through the topsoil, and this layer could be made of decorative pumice stone or other material with good insulating properties. The pot consists of an inner wall 505 and an outer wall 506. Between these two walls is a thermoelectric panel. The apparatus of FIG. 10a does not contain an airflow layer, as natural convection removes heat from wall 506 when the soil is being cooled. By reversing the electrical current in the thermoelectric panel, the soil is warmed instead of cooled. The temperature probe in FIG. 10b shows that the soil near the side 506 is 67.4 F; FIG. 10c shows that the temperature of the soil in the center of the pot is 70.0 F and the ambient temperature is 79.6 F. These temperature readings were taken in steady state conditions and show that the soil is cooled by about 10 degrees F. from ambient by the thermoelectric panel, meeting the requirement to cover optimum temperature range of + or −10 F shown in FIG. 9(a). FIG. 10d shows that this result was accomplished by applying 6.3 volts and 2.11 amps to the thermoelectric panel, which included a thermoelectric string of 85 junctions.

Figure 11:
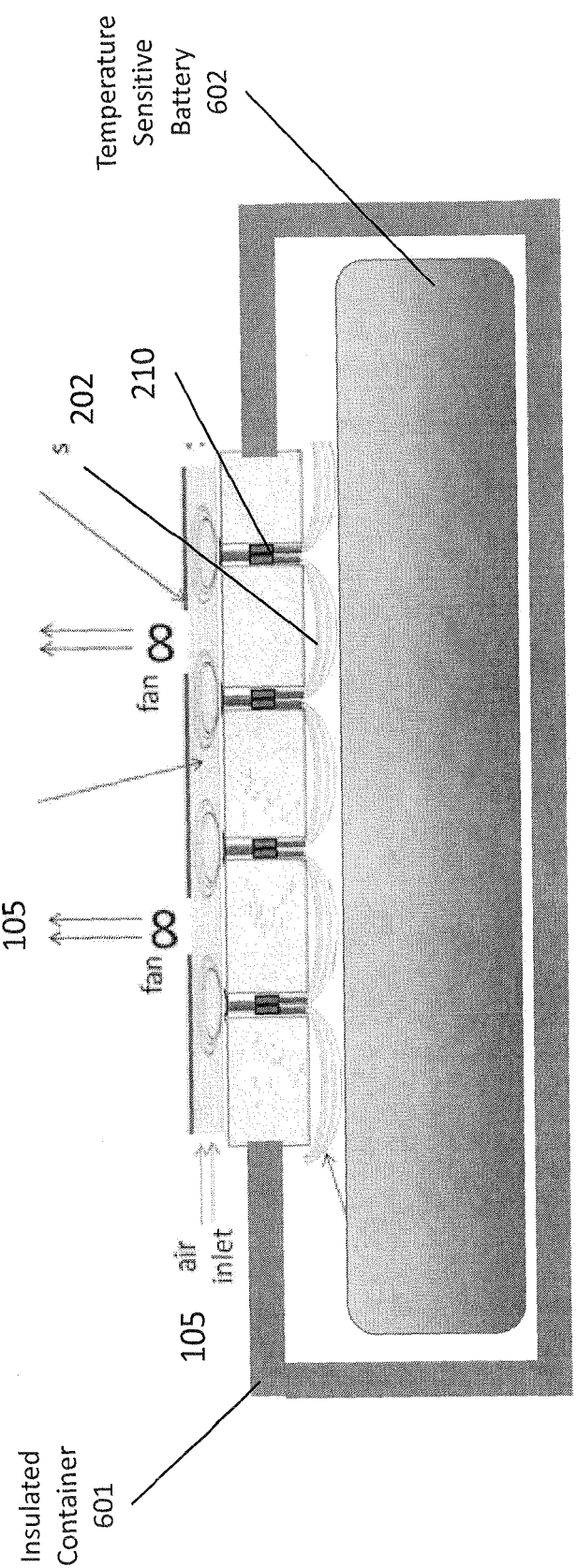
FIG. 11 shows a thermoelectric panel and airflow system for heating and cooling a battery to control its temperature.

Yet another application of a thermoelectric string, panel, and possibly an airflow layer is thermal management of batteries. Battery temperature needs to be controlled for three reasons: efficiency, lifetime, and safety. FIG. 11 shows how the a thermoelectric string 202 and 210 is in thermal contact with a battery 602 on one side and possibly an airflow layer on the other side that contains moving air 105. Alternatively, a cold plate that is in thermal contact with the loop wires could replace the airflow layer. An insulated container 601 is added if the temperature outside the battery is adversely affecting its temperature in the regions beyond the thermoelectric panel.

Figure 12B:
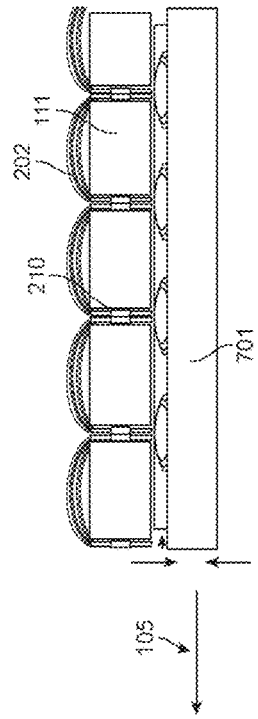
FIGS. 12(a), 12(b), and 12(c) show how a thermoelectric panel may be combined with a heat spreader to aid in moving the airflow system to the side of the panel.
Figure 12C:
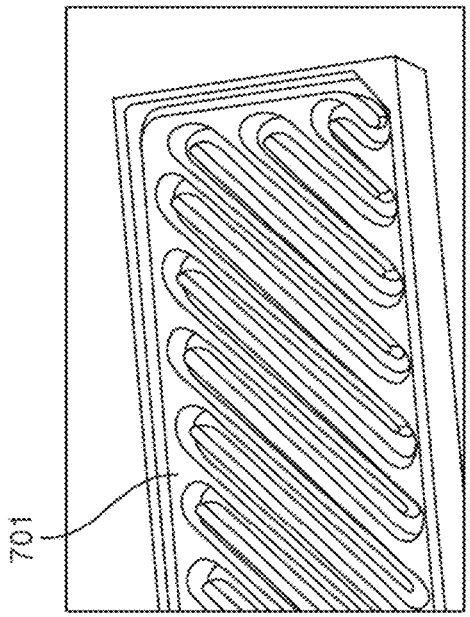
Figure 12A:
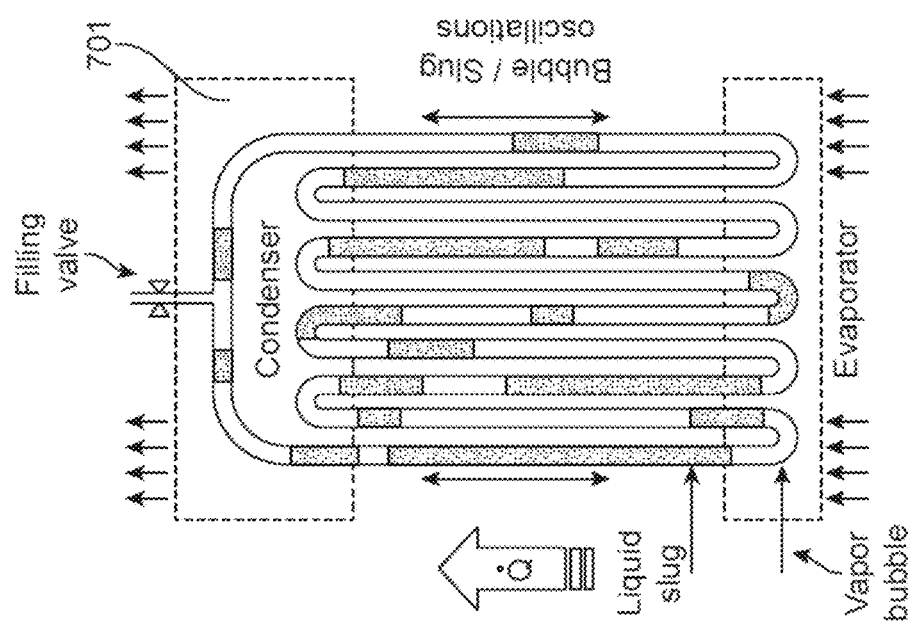

Many applications for thermoelectric panel are challenged in having the airflow layer covering one whole side of the panel. In seating and bedding, for example, forming an airflow layer underneath the panel and under the weight of the user presents design and form-factor challenges in some cases. In these cases, it is helpful to have a heat spreader that can move the excess heat to another location that is more convenient for the airflow layer or other heat exchanger. FIG. 12a illustrates a thin plate 701 with a moving fluid inside that moves heat very effectively from the flat area to the sides. FIG. 12b shows an actual product from ThermAvant Technologies, Inc. that spreads heat using this method. In FIG. 12c, this heat spreader 701 is mounted underneath, and in thermal contact with, the thermoelectric panel 111. Because of the spreader 701 essentially conducts heat very effectively, the airflow 105, or other heat exchanger, may be moved to another location. In FIG. 12c, this new location is at the end of the spreader 701.

Without limitation, the inventions described herein can be applied to seats, seat backs, seat tops, bed tops, wheelchair cushions, hospital beds, animal beds, and office chairs.

We claim:

1. A thermoelectric cooling device comprising a plurality of thermoelectric elements and a plurality of thermoelectric strings inserted into a multi-layer foam stack, wherein a first layer of said multi-layer foam stack is optimized for softness and a second layer of said multi-layer foam stack comprises pillars and is optimized for softness and airflow combined, wherein said plurality of thermoelectric strings comprises strings in a folded-over configuration away from said plurality of thermoelectric elements and adjacent to a first surface of said first layer, wherein a plane of said plurality of thermoelectric elements is separate from a plane of said plurality of thermoelectric strings, wherein said plane of said thermoelectric elements intersects said plane of said plurality of thermoelectric strings adjacent to said first surface of said first layer at an angle of less than 90 degrees, and wherein said pillars are (i) in a staggered configuration to maximize uniformity of airflow and (ii) attached to a second surface of said first layer in a configuration that permits independent vertical movement, thereby distributing pressure evenly.

2. The device of claim 1, further comprising a fan and an electrical power source.

3. The device of claim 1, wherein said airflow exits said multi-layer foam stack in multiple directions to compensate for a blockage in one direction.

4. The device of claim 1, wherein:
(a) a cross-section of said pillars is circular, square, hexagonal, or octagonal; or
(b) the pillars are formed by molding, by routing, or by linear wire cutting, wherein the wire cutting preferably employs a hot wire, an abrasive wire, or a vibrating wire.

5. The device of claim 1, wherein the plurality of thermoelectric strings further comprise a strain relief to prevent breaking of the plurality of thermoelectric strings during repeated and long term use.

6. The device of claim 5, wherein:
(a) the strain relief is a foam plug that encapsulates the plurality of thermoelectric elements and comprises channels for said plurality of thermoelectric strings to exit the plug;
(b) the strain relief is a foam plug having a Y cut shape or a drilled hole;
(c) the strain relief comprises tubing and flaps or nipples of latex, rubber, silicone, Teflon, polyurethane, or plastic;
(d) the strain relief comprises tape attached along the plurality of thermoelectric strings and extending beyond the plurality of thermoelectric elements wherein the tape is comprised of foam, rubber, plastic, Teflon, gel, or a solidifying liquid;
(e) the strain relief comprises tape that includes fibers for increasing a tensile strength of the tape and wherein the fibers are glass, nylon or cloth; or
(f) the strain relief is cloth woven together with said plurality of thermoelectric strings.

7. The device of claim 1, wherein the plurality of thermoelectric strings are made from links of woven wires.

8. The device of claim 7, wherein said folded-over configuration includes a double fold of said links of the plurality of thermoelectric strings.

9. The device of claim 1, wherein the plurality of thermoelectric elements are placed directly above the pillars or above and between the pillars.

10. The device of claim 1, wherein the plurality of thermoelectric strings are placed in the multi-layer foam stack such that stress cycles during use avoid a plastic deformation regime generated by bending of said plurality of thermoelectric strings.

11. The device of claim 1, further comprising material between a portion of said plurality of thermoelectric strings positioned along a surface of said multi-layer foam stack to make the surface of said multi-layer foam stack smoother and wherein the material is matched in firmness or profile height or both to said plurality of thermoelectric strings.

12. The device of claim 1, further comprising a textured material covering said first layer of said multi-layer foam stack, said textured material comprising textile, rubber, vinyl, leather, or other seat covering material.

13. The device of claim 1, further comprising a heat spreader to move excess heat from said second layer of said multi-layer foam stack to another location.

14. The device of claim 13, wherein the heat spreader comprises fluid flow or phase change materials.

15. The device of claim 1, further comprising a battery that facilitates heating or cooling using said plurality of thermoelectric elements, an occupancy switch that turns off said device when not in use, or an enclosure having said multi-layer foam stack.

16. The device of claim 6, wherein said strain relief is combined with other material to insulate said plurality of thermoelectric strings that connect said plurality of thermoelectric elements.

17. The device of claim 1, wherein said plurality of thermoelectric stings are placed underneath a flap of foam in said first layer of said multi-layer foam stack.

18. The device of claim 12, wherein dimensions and separation of the texture features match dimensions and separation of said plurality of thermoelectric strings.

* * * * *